US009258417B2

United States Patent
Krieg

(10) Patent No.: US 9,258,417 B2
(45) Date of Patent: Feb. 9, 2016

(54) INTERCONNECTED VOICE RESPONSE UNITS

(71) Applicant: International Business Machines Corporation, Armonk, NY (US)

(72) Inventor: George A. Krieg, Hazelwood, MO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/077,894

(22) Filed: Nov. 12, 2013

(65) Prior Publication Data
US 2015/0131787 A1    May 14, 2015

(51) Int. Cl.
*H04M 3/493*   (2006.01)
*H04M 3/42*    (2006.01)
*G06Q 50/26*   (2012.01)

(52) U.S. Cl.
CPC ............. *H04M 3/493* (2013.01); *G06Q 50/265* (2013.01); *H04M 3/42221* (2013.01)

(58) Field of Classification Search
CPC ...................................................... H04M 3/493
USPC .............................. 379/88.01, 93.02, 142.01, 379/265.01–266.1, 88.17–88.21; 705/14.53; 707/623
See application file for complete search history.

(56) References Cited

U.S. PATENT DOCUMENTS

| 8,315,363 | B2 | 11/2012 | Phelps et al. | |
|---|---|---|---|---|
| 2007/0189479 | A1* | 8/2007 | Scherer | 379/142.01 |
| 2010/0054431 | A1 | 3/2010 | Jaiswal et al. | |
| 2010/0114822 | A1* | 5/2010 | Pollock et al. | 707/623 |
| 2011/0064208 | A1* | 3/2011 | Kargman et al. | 379/93.02 |
| 2011/0282739 | A1* | 11/2011 | Mashinsky et al. | 705/14.53 |
| 2013/0129073 | A1 | 5/2013 | Peterson et al. | |

OTHER PUBLICATIONS

Beranek, B. et al., "Authenticating Customers with Nuance Voice Biometrics Solutions", IBM Corporation, Redbooks, 2012, 20 pages.
IPCOM000112770D, "Secure Access to Telephony Processors Voice Response Units", IP.com, Original Publication Date Jun. 1, 1994, IP.com Electronic Publication Mar. 27, 2005, 3 pages.
Internet Society et al., "Session PEERing for Multimedia INTerconnect (SPEERMINT) Security Threats and Suggested Countermeasures (RFC6404)", IP.com, Original Publication Date Nov. 1, 2011, IP.com Electronic Publication Dec. 4, 2011, 45 pages.

* cited by examiner

*Primary Examiner* — Md S Elahee
(74) *Attorney, Agent, or Firm* — John Pivnichny

(57) ABSTRACT

A method and system of collecting confidential data by means of initiating a bridge call with a caller and a vendor. The bridge call allows an interconnection between a merchant's Interactive Voice Response unit (IVR) and a vendor's Interactive Voice Response unit (IVR) without the need to loop the caller back to the merchant after the confidential data is collected. An Automatic Number Identification field is present on each call to identify the caller. A caller enters confidential data into a vendor's IVR using the telephone. Once the confidential data is validated and stored, the vendor updates a call management repository record and terminates the bridge call.

12 Claims, 2 Drawing Sheets

INTERCONNECTED VOICE RESPONSE UNITS

BACKGROUND OF THE INVENTION

Field of the Invention

The invention relates to the interconnection of voice response units to secure the collection of confidential data. More specifically, the invention relates to initiating a bridge call with a caller, indentifying the caller by an Automatic Number Identification field, validating the confidential data input, updating the record in a call (CMR) management repository and terminating the call.

BRIEF SUMMARY OF THE INVENTION

Description of the Related Art

In U.S. Patent Application 20100054431-A1, Jaiswal describes a system and method to select and retrieve contact center transactions stored in a queuing mechanism with an interactive voice system configured to accept at least one call and dynamically populate a web form with call data associated with the one call. When a caller calls into an IVR system, the incoming call may be associated or otherwise linked to the call via a unique identifier. The caller's phone number, as well as information associated with the caller's phone number, such as an address, account number, etc., may be obtained automatically upon identifying the incoming call. The call data or parts thereof may be encrypted using, e.g., secure transaction technologies. This ensures that confidential and/or sensitive information is secured.

In. U.S. Pat. No. 8,315,363-B2 Phelps describes a system and method of network call recording with identification of a call received at the Voice Response Unit (VRU) as a call matching one or more parameters of the call recording request; and using available digital signal processing resources of the VRU to record one or more specified portions of call secure communication capability with encryption is implemented to accommodate confidential or sensitive data.

In U.S. Patent Application 20130129073 A1, Peterson describes systems and methods of parallel media communication in contact handling systems, with Interactive Voice Response (IVR) unit and confidential communications.

The above patents, US 20100054431-A1, U.S. Pat. No. 8,315,363-B2, and US 20130129073 A1 by Jaiswal, Phelps, and Peterson, shall be incorporated herein by reference in their entireties.

DETAILED DESCRIPTION OF THE INVENTION

For a better understanding of the present invention, together with other and further objects, advantages, and capabilities thereof, reference is made to the following disclosure and the appended claims in connection with the above-described drawings.

Figure 1:
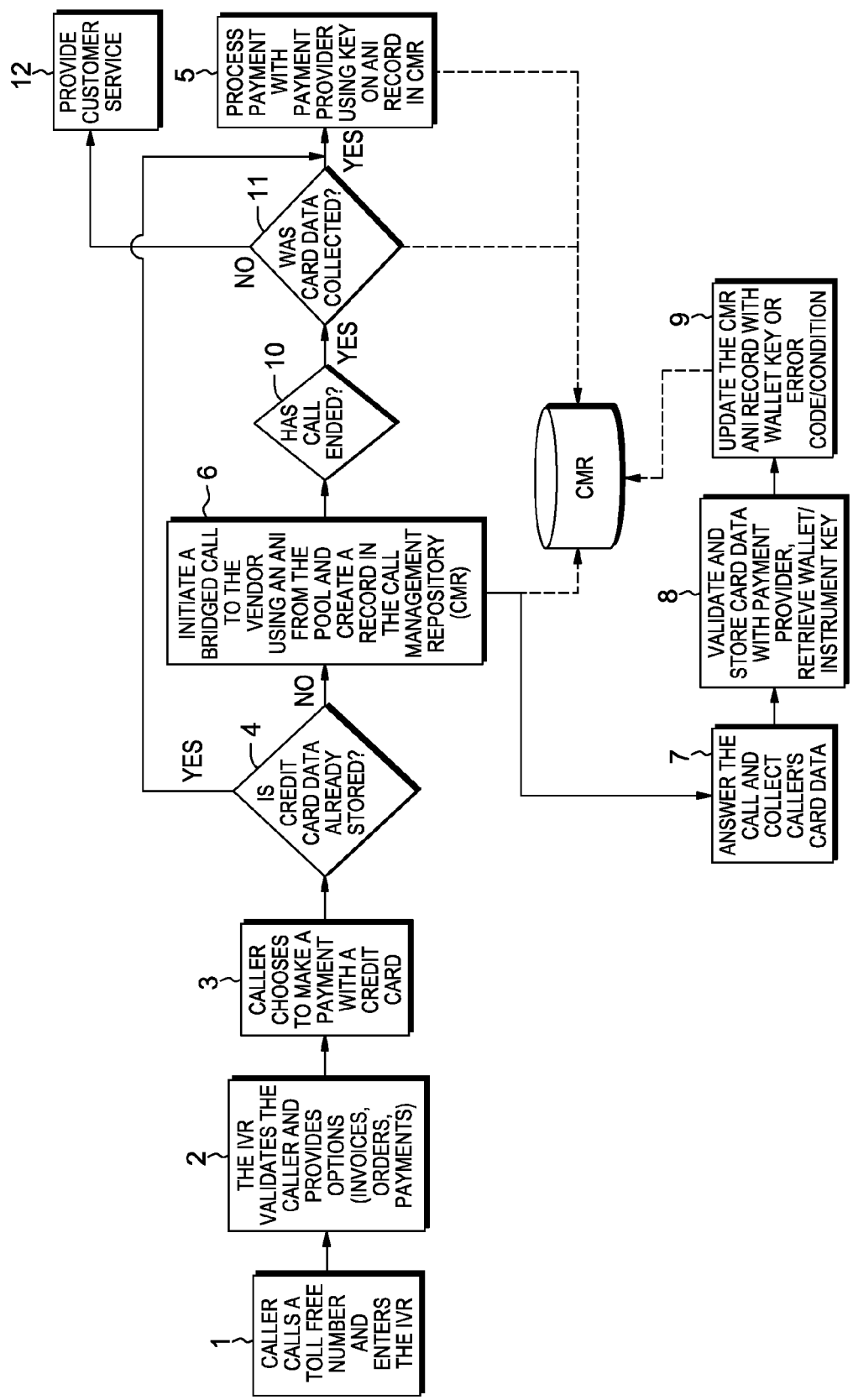
FIG. 1 is a flowchart illustrating the basic operational steps of an embodiment of the present invention.

In FIG. 1, there is shown a flowchart depicting steps performed in practicing one embodiment of the invention. In step 1, a caller using a telephone device dials a number that connects to a merchant's Interactive Voice Response unit. The number may be a toll-free number.

In step 2, a merchant's Interactive Voice Response unit validates the caller leveraging the use of an ANI, Automatic Number Identification and the caller's response to challenge questions, such as the last four digits of their social security number. This ANI is the telephone number from which a call was made. A caller is then prompted to choose the type of transaction a caller wants to complete. The options may include invoices, orders, or payments.

In step 3, the caller chooses to make a payment transaction using a credit card.

In step 4, the Merchant's Interactive Voice Response unit determines whether the customer's credit card number has been previously stored. The credit card number is the confidential data that the invention allows to be uniquely collected. The merchant does not have visibility to this confidential data, but does have visibility to a key that points to the data stored with the vendor. The key is an alphanumeric string.

In step 5, if the credit card number has been previously stored, the vendor will process the payment using the merchant's key to point to the confidential credit card number that it has previously stored.

In step 6, if the credit card number is not currently stored at the vendor, a bridge call is initiated to the vendor using an Automatic Number Identification from a pool of special numbers. A merchant must have a sufficient pool of special numbers so that re-use does not compromise caller identity. A bridge call is defined herein as a call between a merchant's IVR and a vendor's IVR without the need to loop the caller back to the merchant upon collection of the confidential data. Using the bridge call allows the merchant to keep control of the call even if the call fails at the vendor. Using the bridge call eliminates routing a call to the vendor and then back again to the merchant. A record is created in the Call Management Repository (CMR) as shown in FIG. 1.

In step 7, a caller's credit card data, including card number and expiration date, is entered by the caller in the vendor's Interactive Voice Response unit. The caller may use a numeric key pad on the telephone or alternatively speak the data numbers into the microphone of the telephone.

In step 8, the credit card data is validated and stored into a vendor's repository, referred to as an electronic wallet and a key is created that is specific to the confidential credit card data.

In step 9, the corresponding key is returned to the merchant, referred to as the wallet key, and the merchant's record is updated with this key.

In step 10, the determination is made to end the call or not to end the call, depending on whether the transaction was successful.

In step 11, if the credit card data was successfully collected, the merchant can proceed to use the key to reference the card and process a payment.

In step 12, if the credit card data was not successfully collected, the call is routed to the merchant's own agent to provide customer service.

Figure 2:
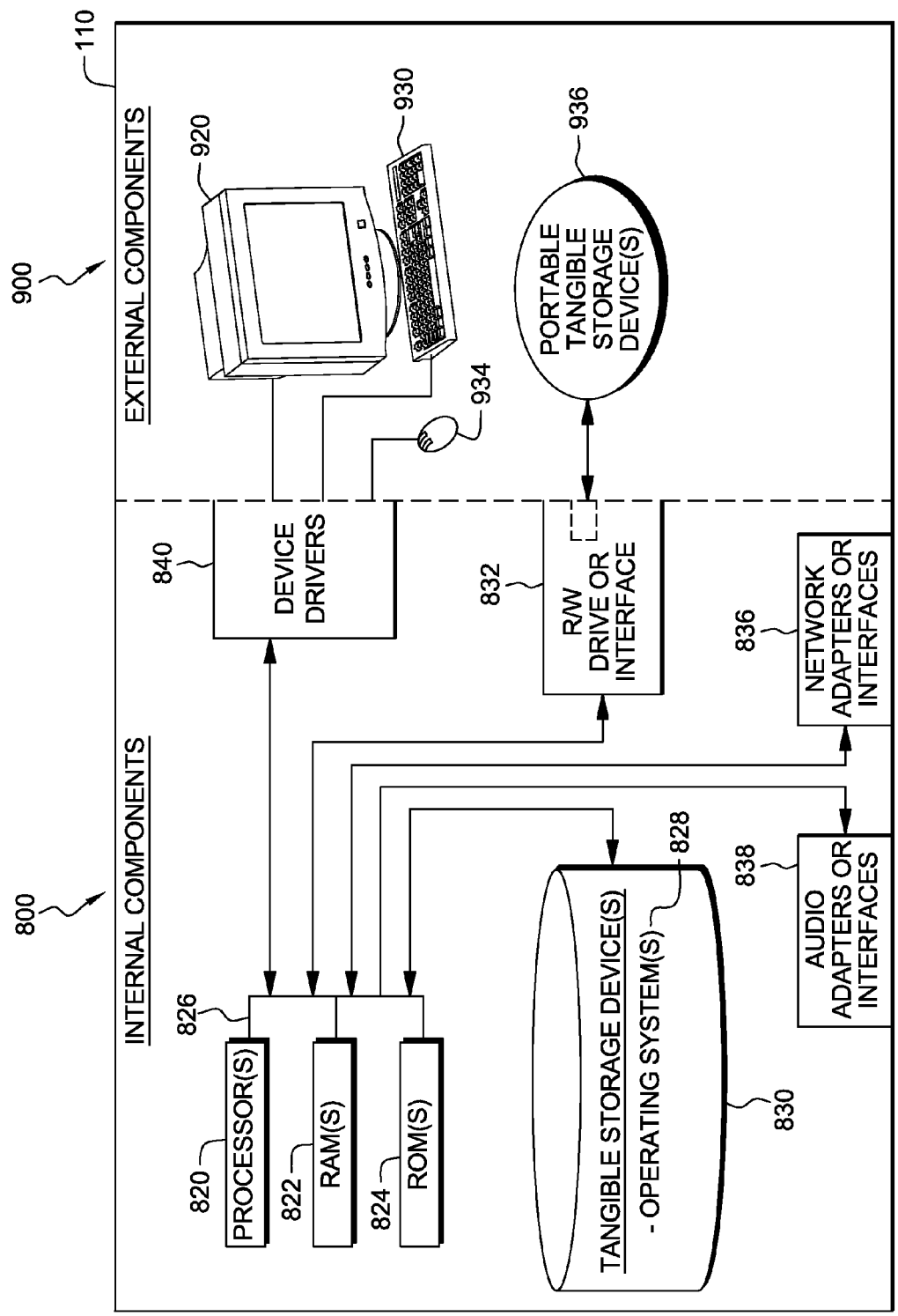
FIG. 2 is a system of a computer hardware and software product for use in implementing portions of the present invention.

FIG. 2 shows a block diagram of internal components 800 and external components 900 of a computer 110, in accordance with an illustrative embodiment of the present invention. It should be appreciated that FIG. 2 provides only an illustration of one implementation and does not imply any limitations with regard to the environments in which different embodiments may be implemented. Many modifications to the depicted environments may be based on design and implementation requirements.

Computer 110 is representative of any electronic device capable of executing machine-readable program instructions. Computer 110 may be representative of a computer system or other electronic devices. Examples of computing systems, environments, and/or configurations that may be represented by computer 110 include, but are not limited to, personal computer systems, server computer systems, thin clients, thick clients, laptop devices, smartphones, multiprocessor systems, microprocessor-based systems, network PCs, minicomputer systems, and distributed cloud computing environments that include any of the above systems or devices.

Computer 110 includes a set of internal components 800 and external components 900. Internal components 800 includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, functions in computer device 110 are stored on one or more of the respective computer-readable tangible storage devices 830 for execution by one or more of the respective processors 820 via one or more of the respective RAMs 822 (which typically include cache memory). In the embodiment illustrated in FIG. 2, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Internal components 800 also includes a R/W drive or interface 832 to read from and write to one or more portable computer-readable tangible storage devices 936, such as a CD-ROM, DVD, memory stick, magnetic tape, magnetic disk, optical disk or semiconductor storage device. Functions in computer 110 can be stored on one or more of the respective portable computer-readable tangible storage devices 936, read via the respective R/W drive or interface 832 and loaded into the respective hard drive 830.

Internal components 800 also includes audio adapters or interfaces 838 such as a sound card, hardware mixer, amplifier, or other adapters or interfaces for receiving audio signals from microphones.

Internal components 800 also includes network adapters or interfaces 836 such as a TCP/IP adapter cards, wireless wi-fi interface cards, or 3G or 4G wireless interface cards or other wired or wireless communication links. Functions in computer 110 can be downloaded to computer 110 from an external computer via a network (for example, the Internet, Cloud 24, a local area network or other, wide area network) and respective network adapters or interfaces 836. From the network adapters or interfaces 836. The network may comprise copper wires, optical fibers, wireless transmission, routers, firewalls, switches, gateway computers and/or edge servers.

External components 900 can include a computer display monitor 920, a keyboard 930, and a computer mouse 934. External components 900 can also include touch screens, virtual keyboards, touch pads, pointing devices, and other human interface devices. Internal components 800 includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

The foregoing description of various embodiments of the present invention has been presented for purposes of illustration and description. It is not intended to be exhaustive or to limit the invention to the precise form disclosed. Many modifications and variations are possible. Such modifications and variations that may be apparent to a person skilled in the art of the invention are intended to be included within the scope of the invention as defined by the appended claims.

What is claimed is:

1. A method of collecting confidential data in a single call comprising the steps of:
   initiating a bridge call with a caller and a vendor by a merchant Interactive Voice Response (IVR) unit wherein said bridge call is a call between said merchant's IVR and said vendor's IVR without the need to loop said caller back to said merchant upon collection of said confidential data wherein said merchant does not have visibility to said confidential data;
   said vendor identifying said caller by the Automatic Number Identification field of said caller; and
   said caller entering said confidential data in said vendor's IVR and said vendor updating a call management repository record and thereafter terminating said bridge call.

2. The method of claim 1, wherein said confidential data is a collection of data derived from said caller's bridge call.

3. The method of claim 2, wherein said caller calls a toll free number and chooses from a list of options, such as invoices, orders, and payment transactions said caller wants to process.

4. The method of claim 3, wherein validation of said caller is identified by said Automatic Number Identification field, which contains the telephone number from which the call was made from.

5. The method of claim 1, further comprising parallel communication is made between said merchant's Interactive Voice Response unit and Interactive Voice Response unit of said vendor.

6. The method of claim 5, further comprising validating said confidential data.

7. A system for collecting confidential data in a single call, comprising:
- a merchant's Interactive Voice Response (IVR) unit that validates a caller using an Automatic Number Identification field wherein said merchant does not have visibility to said confidential data;
- a vendor's Interactive Voice Response unit that captures confidential data from said caller and enters said confidential data in said vendor's IVR via a bridge call from said merchant's Interactive Voice Response unit wherein said bridge call is a call between said merchant's IVR and said vendor's IVR without the need to loop said caller back to said merchant upon collection of said confidential data; and
- a call management repository record where said confidential data is stored and said vendor updates said record.

8. The system of claim 7, wherein the system validates the confidential data in an Automatic Number Identification field of a call made from another Interactive Voice Response unit.

9. The method of claim 8, wherein the system validates said confidential data entered from options chosen by said caller and initiates a bridge call to said vendor.

10. The system of claim 7, wherein a record is created in said call management repository record and said system validates said stored confidential data.

11. The system of claim 9, wherein said system processes a transaction based on said options chosen and updates the call management repository record, and terminates said bridge call.

12. A computer program product for collecting confidential data in a single call, said computer program product comprising:
- a computer readable non-transitory storage medium;
- first program instructions for initiating a bridge call with a caller, and a vendor by a merchant Interactive Voice Response (IVR) unit to a vendor Interactive Voice Response unit wherein said bridge call is a call between said merchant's IVR and said vendor's IVR without the need to loop said caller back to said merchant upon collection of said confidential data and wherein said merchant does not have visibility to said confidential data;
- second program instructions for said vendor identifying said caller by an Automatic Number Identification field of said caller; and
- third program instructions for said caller entering said confidential data in said vendor's IVR and said vendor updating a call management repository record and thereafter terminating said bridge call; and wherein
- all said program instructions are recorded on said medium.

* * * * *